United States Patent [19]

Harris et al.

[11] Patent Number: 4,784,067

[45] Date of Patent: * Nov. 15, 1988

[54] LIGHTWEIGHT CENTER BEAM RAILROAD CAR

[75] Inventors: William H. Harris, Michigan City, Ind.; James P. Klag, Crestwood; Joseph W. Lam, Chicago, both of Ill.

[73] Assignee: Thrall Car Manufacturing Company, Chicago Heights, Ill.

[*] Notice: The portion of the term of this patent subsequent to Oct. 1, 2002 has been disclaimed.

[21] Appl. No.: 74,347

[22] Filed: Jul. 16, 1987

Related U.S. Application Data

[63] Continuation of Ser. No. 802,428, Nov. 27, 1985, Pat. No. 4,681,041.

[51] Int. Cl.$^4$ .......................... B61D 3/08; B61D 17/00
[52] U.S. Cl. ................................... 105/355; 105/404; 105/411; 105/416; 105/419
[58] Field of Search ............... 105/355, 404, 411, 413, 105/414, 416, 396, 419

[56] References Cited

U.S. PATENT DOCUMENTS

| | | |
|---|---|---|
| 2,839,328 | 6/1958 | Prickett et al. |
| 2,940,402 | 6/1960 | Hansen ............... 105/367 |
| 2,996,020 | 8/1961 | Udstad ............... 105/367 |
| 3,159,112 | 12/1964 | Tomlinson ............ 105/367 |
| 3,230,900 | 1/1966 | Ruprecht et al. ....... 105/411 X |
| 3,244,120 | 4/1966 | Taylor ................ 105/414 |
| 3,675,592 | 7/1972 | Bateson et al. ........ 105/414 X |
| 3,677,193 | 7/1972 | Pringle ............... 105/368 R |
| 4,082,045 | 4/1978 | McNally et al. ........ 105/406.1 X |
| 4,543,887 | 10/1985 | Baker ................. 105/355 |
| 4,681,041 | 7/1987 | Harris et al. ......... 105/355 |

Primary Examiner—Martin P. Schwadron
Assistant Examiner—Stephen M. Hepperle
Attorney, Agent, or Firm—Marshall, O'Toole, Gerstein, Murray & Bicknell

[57] ABSTRACT

A freight carrying railroad car including a body supported at each end by wheel-containing trucks; the body having a vertical center beam extending the length of the car between bulkheads at each end of the car; the center beam having a center sill, a top sill parallel to and spaced above the center sill, and a plurality of vertical spaced apart columns connected at their lower ends to the center sill and at their upper ends to the top sill; a vertical plate at each end of the car extending from the center sill to the top sill, and from the respective bulkhead at that end inwardly along the center sill; each vertical plate being joined to the center sill, top sill, bulkhead and a plurality of said columns such that opposed facing ends of said vertical plates are spaced from each other a distance of at least about 60% of the length of said car between the bulkheads; and between the facing end of each of the vertical plates and the car length center, at least one bracing bar extending diagonally downwardly, toward the car length center, from the top sill to the center sill, so that when the car is subjected to impact loads the bars on one side of the car center are placed in tension and the bars on the other side of the car center are placed in compression.

7 Claims, 3 Drawing Sheets

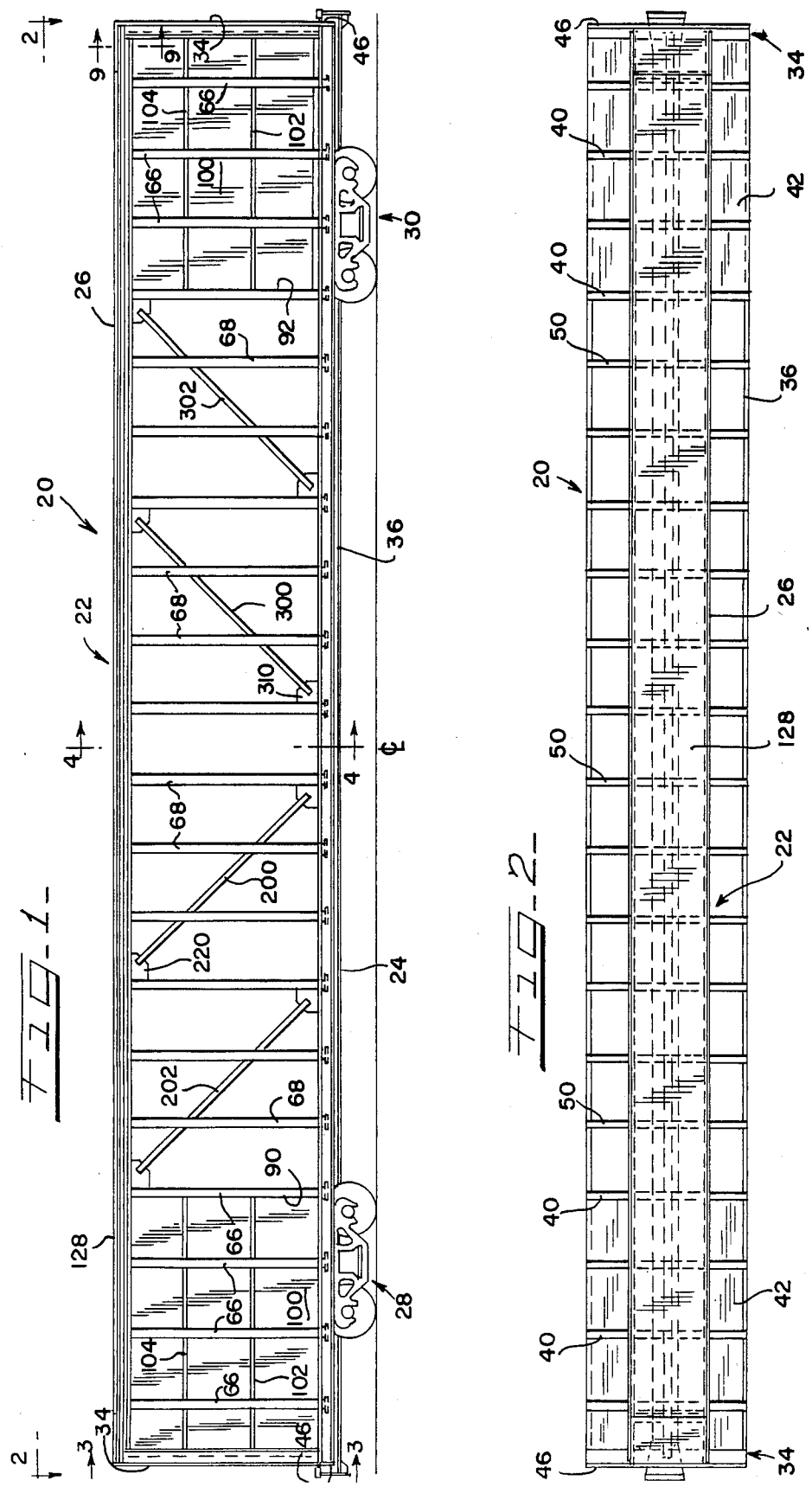

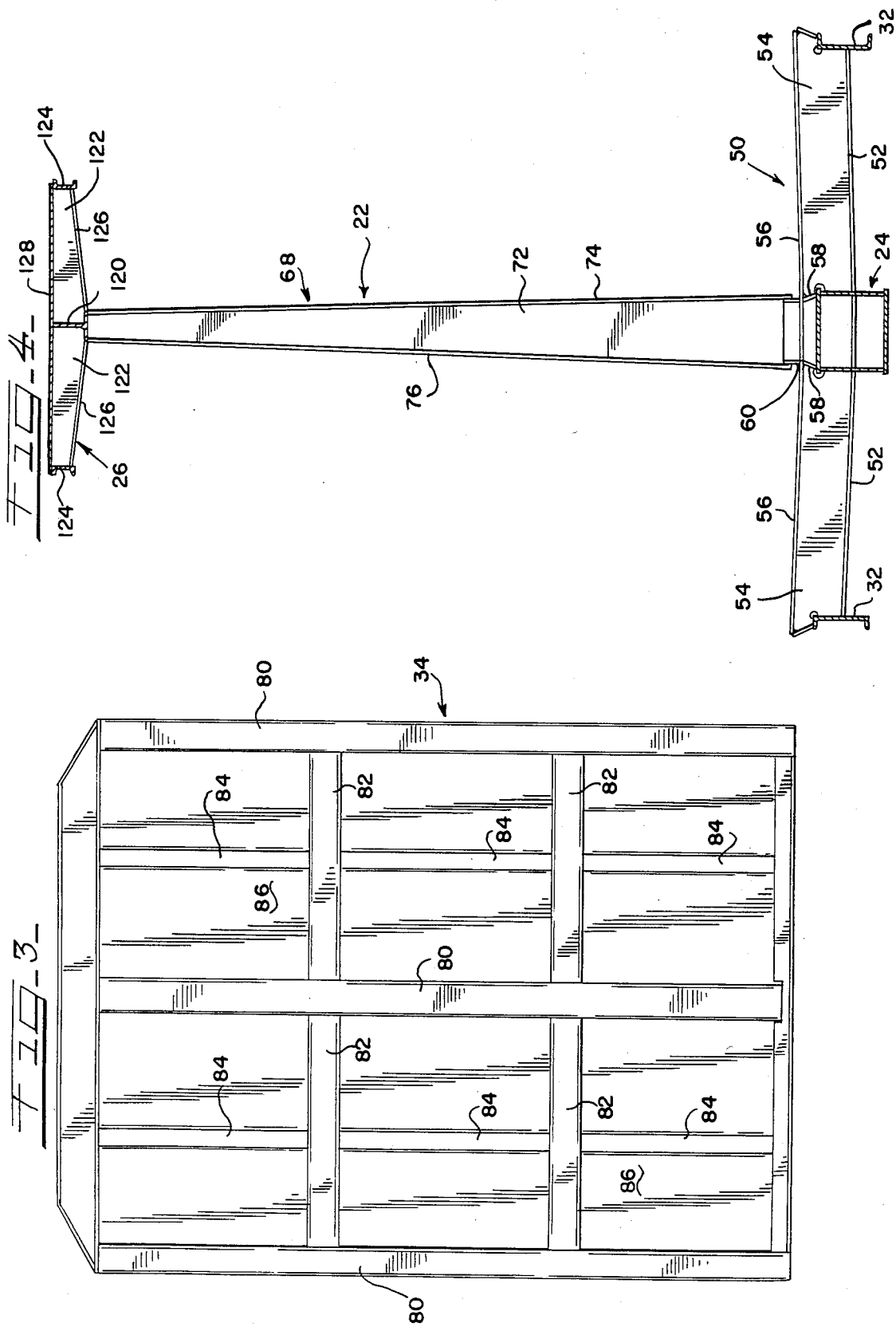

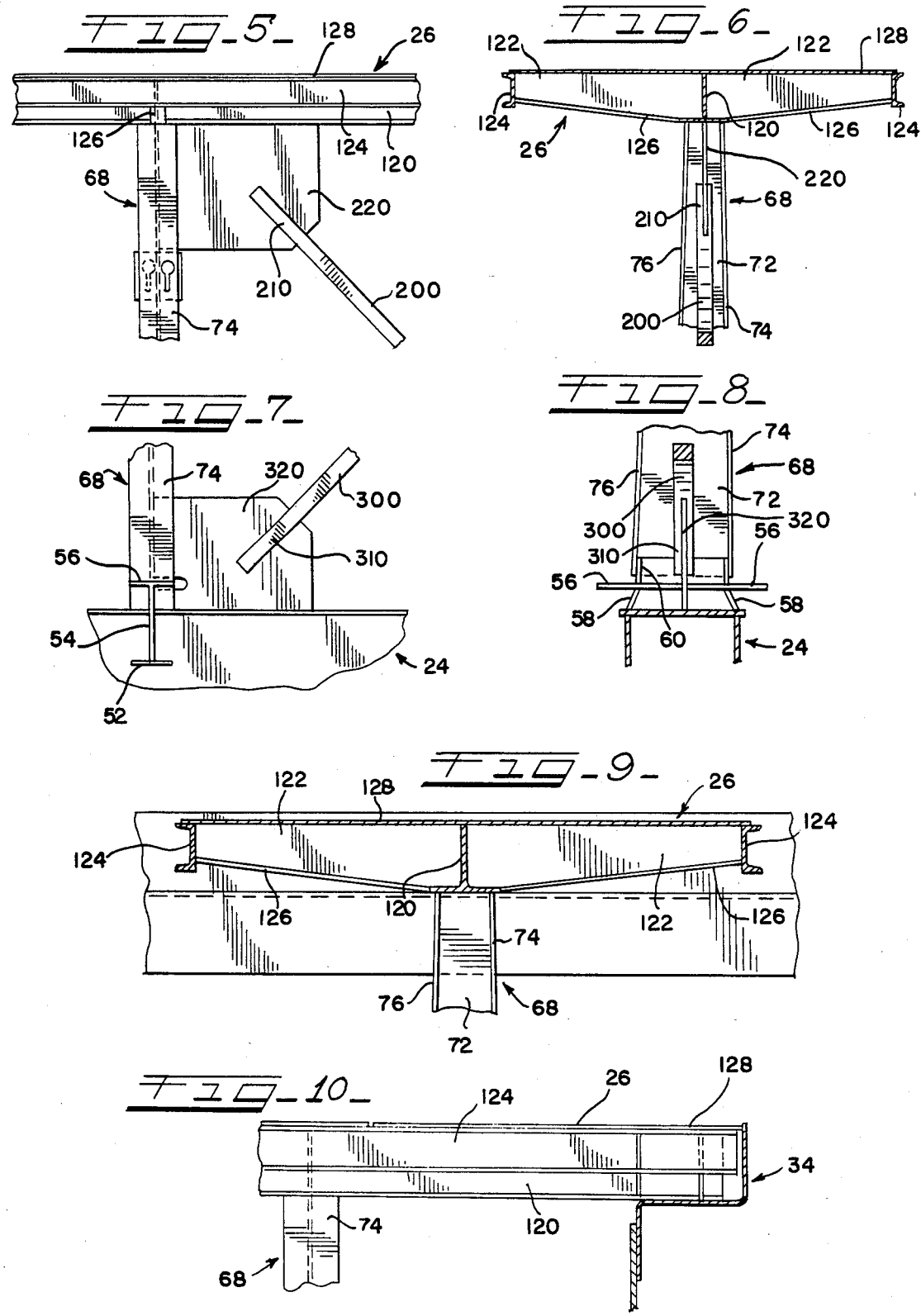

LIGHTWEIGHT CENTER BEAM RAILROAD CAR

This is a continuation, of application Ser. No. 802,428, filed Nov. 27, 1985, now U.S. Pat. No. 4,681,041.

This invention relates to railroad cars. More particularly, this invention is concerned with an improved lightweight center beam railroad freight car.

BACKGROUND OF THE INVENTION

Center beam railroad freight cars have been in use hauling lumber, plywood and other sheet materials for about twenty years. This type of car is disclosed in Taylor U.S. Pat. No. 3,244,120 and Wagner U.S. Pat. No. 3,734,031.

Baker U.S. Pat. No. 4,543,887 discloses an improved center beam car in which the principal distinguishing feature for lightweight and good strength is the use of a vertical center beam extending longitudinally the length of the car between bulkheads at each end of the car; the center beam comprising a center sill, a top sill parallel to and spaced above the center sill, and a plurality of vertical spaced apart columns rigidly connected at their lower ends to the center sill and at their upper ends to the top sill; and at each end of the car, a vertical plate extending from the center sill to the top sill, and from the bulkhead at that end inwardly along the center sill; the vertical plate being joined to the center sill, top sill, bulkhead and a plurality of said columns and having a width no more than about 20% and generally more than 10% of the distance between the bulkheads.

The vertical plates extending from the center sill to the top sill will generally have vertical inner edges and the area between those edges is to be maintained open, except for the columns, to keep the car lightweight. The area between the inner edges of the vertical plates at each end of the car is intended to be free of bracing. Also, the vertical plates desirably extend through the central portion of the columns to which they are joined.

It has been found that a railroad car according to the disclosure of the Baker U.S. Pat. No. 4,543,887 has a highly efficient load to empty weight ratio when the car length is in the range of about sixty to seventy-one feet long. However, longer cars, such as about seventy-two to ninety feet in length, which use the design of the Baker patent and are intended to carry maximum loads as dictated by axle capacities, have been found by studies to have insufficient strength to meet impact load requirements set by American railroads. A need accordingly exists for a further improved lightweight center beam railroad car which satisfies these requirements.

SUMMARY OF THE INVENTION

According to the invention a freight carrying railroad car is provided having a predetermined length comprising a body supported at each end by wheel-containing truck means; the body having a vertical center beam extending longitudinally the length of the car between bulkheads at each end of the car; the center beam comprising a center sill, a top sill parallel to and spaced above the center sill, and a plurality of vertical spaced apart columns rigidly connected at their lower ends to the center sill and at their upper ends to the top sill; a vertical plate, at each end of the car, extending from the center sill to the top sill, and from the respective bulkhead at that end inwardly along the center sill; each vertical plate being joined to the center sill, top sill, bulkhead and a plurality of said columns such that opposed facing ends of said vertical plates are spaced from each other a distance of at least about 60% of the length of said car between the bulkheads; and between the facing end of each of the vertical plates and the car length center, at least one bracing bar extending diagonally downwardly, toward the car length center, from the top sill to the center sill, so that when the car is subjected to impact loads the bars on one side of the car lateral center line are placed in tension and the bars on the other side of the car lateral center line are placed in compression.

The bar braces can extend through openings in the columns or the bar braces can be placed along the sides of the columns.

Desirably, the car has at least four such diagonal bar braces with one-half the number of bar braces being on each side of the car longitudinal center. Additionally, the bar braces on each side of the car longitudinal center can be positioned about parallel to each other. Regardless of the number of bar braces, they can be directed at an angle of about 45° to the center sill.

The ends of each bracing bar can be connected to vertical plates, with the upper end of each bar connected to a vertical plate joined to a column and to the top sill, and with the lower end of each bar connected to a vertical plate joined to a column and the center sill.

The use of bar braces is particularly suitable when the car is longer than seventy-two feet and up to a maximum of about ninety feet for American railroads.

To handle the increased stresses imposed on a long car, the center beam top sill can be provided with a center structural member, extending the length of the car between the bulkheads, joined to the top of the columns; a side structural member, extending between the bulkheads, on each horizontal side of and parallel to the center structural member; a vertical plate or web, extending laterally from each side structural member to the center structural member, adjoining each column top; a separate horizontal strip plate or flange, joined to the bottom edge of each vertical plate, extending from each side structural member to the center structural member; and, a horizontal longitudinal plate running the length of the car and joined to the top of the side structural members and the center structural member and desirably the vertical plates or webs. The structural members can be channel members and the horizontal longitudinal plate can have a width equal to the distance between the channel members. The width of the top sill between the structural members desirably is at least 40% of the width of the car.

BRIEF DESCRIPTION OF THE DRAWINGS

FIG. 1 is a side elevational view of one embodiment of a freight carrying railroad car according to the invention;

FIG. 2 is a plan view of the railroad car shown in FIG. 1 taken along the line 2—2;

FIG. 3 is a end view taken along the line 3—3 of FIG. 1;

FIG. 4 is a sectional view taken along the line 4—4 of FIG. 1;

FIG. 5 is an enlarged side elevational view showing the upper end of a bracing bar connected to a vertical plate joined to the top sill and a center beam column;

FIG. 6 is an enlarged front elevational view of the bracing bar upper end connected to the vertical plate shown in FIG. 5;

FIG. 7 is an enlarged side elevational view showing the lower end of a bracing bar connected to a vertical plate joined to the center sill and a center beam column;

FIG. 8 is an enlarged front elevational view of the bracing bar lower end connected to the vertical plate shown in FIG. 7;

FIG. 9 is a sectional view taken along the line 9—9 of FIG. 1; and

FIG. 10 is a side elevational view of one end of the top sill supported by the top of a bulkhead.

DETAILED DESCRIPTION OF THE DRAWINGS

To the extent it is reasonable and practical, the same or similar elements which appear in the various views of the drawings will be identified by the same numbers.

With reference to FIG. 1, the center beam railroad car 20 has a center beam 22 comprising a lightweight center sill 24, a top sill 26, and columns 66 and 68. Body bolsters (not shown) are joined to the bottom opposite ends of the center sill and they in turn mate with truck bolsters in trucks 28 and 30 to support the car body. The car body ends with end sills 46 from which bulkheads 34 extend vertically upwardly. The center beam 22 extends longitudinally in vertical or upright position between the two bulkheads 34.

Extending laterally from each side of center sill 24 are two different arrangements of cross bearers 40 and 50 joined at their ends to side sills 36. The cross bearers 40 are located at each end portion of the car above the trucks 28 and 30. Those cross bearers are structurally the same as disclosed in U.S. Pat. No. 4,543,887 and include a horizontal shear plate 42 which rests on the top of center sill 24 and extends for the full width of the car to the two side sills 32. The purpose of the shear plate is to transfer some of the draft and buff loads from the center sill to the side sills and to reinforce the car in the vicinity of the body bolster.

The cross bearers 50 (FIG. 4) have a sloped bottom flange 52, a vertical web 54 and a sloped top flange 56 which is supported on the top of center sill 24 by members 58. Extending upwardly from the top of flange 56 are vertical extensions 60 which function as attachments for columns 66 and 68.

Extending upwardly from center sill 24 in the central 60% to 80% or so of the car length between the bulkheads, where the cross bearers join the center sill, is a plurality of vertical columns 68 (FIG. 1) which have a web 72 lateral to the center sill and two sloped flanges 74, 76 joined to the web edges. However, at the ends of the car, and primarily above each shear plate 42, a vertical plate 100 extends upwardly for a distance equal to the height of columns 66 and vertically divides those columns in half. Otherwise, columns 66 and 68 are identical. Each plate 100 is joined to its adjacent bulkhead 34. The lower edge of each plate 100 is joined to the center sill 24 and the top edge of each plate 100 is connected to the top sill 26. The plates 100 are further reinforced against buckling by a pair of horizontal members 102, 104 vertically spaced apart on each side of the plate.

The space between adjacent columns 68 is left open except for the bar braces which will be described hereinafter. In other words, the plates 100 are of limited longitudinal length and do not extend the length of the car. The plates 100 generally extend longitudinally of the car only a very short distance beyond the end of the adjacent truck. The longitudinal distance between the vertical edges or ends 90, 92 (FIG. 1) of the two identical plates 100 will generally be from 60 to 80% of the distance between the bulkheads. This arrangement permits a very significant reduction in car weight.

Extending the full length of the car between and joined to the bulkheads is the top sill 26. The top sill 26 includes a center structural member 120 (FIGS. 6 and 9) which is joined to the tops of columns 66, 68. The upper edge of each plate 100 is joined to the bottom of member 120. The ends of the center structural member 120 are joined to the upper portion of each bulkhead 34 (FIG. 10). Extending laterally outwardly, above each column 66, 68, from each side of the center structural member 120 are vertical webs 122 which are joined to the side structural members 124, shown as channel members, which extend the length of the car between the bulkheads and which are parallel to each other and to center structural member 120, which can be an inverted T-member. The bottom of each web 122 has a flange 126 extending from the member 120 to each member 124. Plate 128 is joined to the top of center structural member 120, webs 122 and channel members 124 and it extends longitudinally the full length of the car between the bulkheads 34.

The described top sill 26 desirably has a width which is at least 40%, and better yet about 50% or more, of the width of the car to provide the desired strength for a long car of about seventy-two feet or more.

The construction of bulkheads 34 is of conventional design. The important thing is that the bulkheads be sufficiently strong to transfer forces to center beam 22 without yielding excessively. With reference to FIG. 3, conventional bulkheads 34 can include a framework which includes three vertical spaced apart wide flange beams 80, two or more horizontal and spaced apart pressed channel members 82 and vertical spaced apart angle members 84. The vertical inner face of the framework can be covered with a flat metal sheet 86.

The center beam 22 for a long car, such as at least seventy-two feet, and desirably about eighty feet or more, long is provided with at least two diagonal bar braces 200 and 300. Each of these bar braces 200, 300 is located between one of the vertical facing ends or edges 90, 92 of the vertical plates 100 and the center of the car length (FIG. 1). Each bar brace 200, 300 extends diagonally downwardly toward the center from the top sill 26 to the center sill 24 through holes in a plurality of the webs 72 of columns 68. The bar braces 200, 300 can be positioned at an angle of about 45° to the center sill but each bar brace should slope in an opposite direction with respect to the other bar brace.

FIGS. 5 and 6 illustrate how the upper end 210 of bar brace 200 is joined to the center beam. Vertical plate 220 is joined to web 72 and to the bottom of center structural member 120. Then the bar brace upper end 210 is fitted into a slot cut into plate 220 and then the bar and plate are welded together. In the same manner the upper end of bar 300 is joined to the top sill 26.

FIGS. 7 and 8 illustrate how the lower end 310 of bar brace 300 is joined to the center beam. Vertical plate 320 is joined to web 72 and to the top of center sill 24. Then the bar brace lower end 310 is fitted into a slot cut into plate 320 and then the bar and plate are welded together. In the same manner the lower end of bar brace 200 is joined to the center sill.

For the longer size cars, it is generally desirable to employ a plurality, but an equal number, of diagonal braces sloping in each direction. Thus, with reference to FIG. 1, a bar brace 202, parallel to and spaced away from bar brace 200, can be added and joined to the top sill and center sill as already described. Similarly, bar brace 302, parallel to and spaced away from bar brace 300, can be added and joined to the top sill and center sill as already described.

The diagonal bar braces are used in pairs sloping opposite to each other so that when the car is subjected to an impact load half the number of bar braces is placed in tension and the other half is placed in compression. The result is that the center beam is very efficiently strengthened with minimum increase in weight so that a long, but lightweight center beam car can be provided which is capable of handling long heavy loads.

The foregoing detailed description has been given for clearness of understanding only, and no unnecessary limitations should be understood therefrom, as modifications will be obvious to those skilled in the art.

What is claimed is:

1. A freight carrying railroad car having a predetermined length comprising:
   a body supported at each end by wheel-containing truck means;
   the body having a vertical center beam extending longitudinally the length of the car between bulkheads at each end of the car;
   the center beam comprising a center sill, a top sill parallel to and spaced above the center sill, and a plurality of vertical spaced apart columns rigidly connected at their lower ends to the center sill and at their upper ends to the top sill;
   a each end of the car, a vertical plate (100) in the space from the center sill to the top sill, and the space from the respective bulkhead inwardly to a column of the center sill;
   the opposing vertical plates (100) being spaced from each other a distance of at least about 60% of the length of said car between the bulkheads; and
   between each of the vertical plates (100) and the car length center, at least one bracing bar extending diagonally downwardly, toward the car lateral center line, from near the top sill to the center sill, so that when the car is subjected to impact loads the bars on one side of the car lateral center line are placed in tension and the bars on the other side of the car center are placed in compression.

2. A railroad car according to claim 1 in which the car has at least four such diagonal bar braces with one-half the number of bar braces being on each side of the car lateral center line.

3. A railroad car according to claim 2 in which the bar braces on each side of the car lateral center line are parallel to each other.

4. A railroad car according to claim 1 in which the bar braces are at an angle of about 45° to the center sill.

5. A railroad car according to claim 1 in which the car is generally longer that seventy-two feet.

6. A railroad car according to claim 1 in which the ends of each bracing bar are connected to vertical bar-attaching plates (220), with the upper end of each bar connected to a vertical bar-attaching plate (220) joined to a column or the top sill and with the lower end of each bar connected to a vertical bar-attaching plate (220) joined to a column or the center sill.

7. A freight carrying railroad car having a predetermined length comprising:
   a body supported at each end by wheel-containing truck means;
   the body having a vertical center beam extending longitudinally the length of the car between bulkheads at each end of the car;
   the center beam comprising a center sill, a top sill parallel to and spaced above the center sill, and a plurality of vertical spaced apart columns rigidly connected at their lower ends to the center sill and at their upper ends to the top sill;
   at each end of the car, a vertical plate extending from the center sill to the top sill, and from the respective bulkhead at that end inwardly along the center sill;
   each vertical plate having an inward forcing end; the opposing facing ends of said vertical plates being spaced from each other a distance of at least about 60% if the length of said car between the bulkheads; and
   between each of the facing ends of each of the vertical plates and the car length center, at least one bracing bar extending diagonally downwardly, towards the car lateral center line, from near top sill to the near center sill, so that when the car is subjected to impact loads the bars on one side of the car lateral center line are placed in tension and the bars on the other side of the car lateral center line are placed in compression.

* * * * *

UNITED STATES PATENT AND TRADEMARK OFFICE
CERTIFICATE OF CORRECTION

PATENT NO. : 4,784,067

DATED : November 15, 1988

INVENTOR(S) : WILLIAM H. HARRIS ET AL

It is certified that error appears in the above-identified patent and that said Letters Patent is hereby corrected as shown below:

Column 4, <u>lines 44 and 46</u>, after "center" insert -- ¢ --; Column 6, <u>line 34</u>, change "forcing" to -- facing --, <u>line 37</u>, change "if" to -- of --, <u>line 42</u>, after "near" insert -- the --.

Signed and Sealed this

Twenty-eighth Day of March, 1989

Attest:

DONALD J. QUIGG

*Attesting Officer*   *Commissioner of Patents and Trademarks*